United States Patent [19]

John et al.

[11] 4,108,018
[45] Aug. 22, 1978

[54] GEAR DRIVE WITH SINGLE-HELIX GEARS

[75] Inventors: Erich John, Augsburg; Albert Oesterle, Ottmarshausen; Erich Pollak-Banda, Augsburg, Germany

[73] Assignee: Zahnräderfabrik Renk Aktiengesellschaft, Augsburg, Germany

[21] Appl. No.: 769,203

[22] Filed: Feb. 16, 1977

[30] Foreign Application Priority Data

Feb. 25, 1976 [DE] Fed. Rep. of Germany ....... 2607636

[51] Int. Cl.² ..................... F16H 57/04; F01M 11/00
[52] U.S. Cl. .................................. 74/467; 184/6.12; 184/6.27
[58] Field of Search ............... 74/412 R, 421 R, 424.5, 74/467, 410; 184/6.12, 6.27, 10

[56] References Cited

U.S. PATENT DOCUMENTS

| | | | |
|---|---|---|---|
| 2,762,233 | 9/1956 | Orr | 74/467 X |
| 3,430,508 | 3/1969 | Pope et al. | 74/410 |
| 3,539,035 | 11/1970 | Wolkenstein | 74/467 X |
| 3,685,368 | 8/1972 | Thoma | 74/410 |

*Primary Examiner*—Leonard H. Gerin
*Attorney, Agent, or Firm*—Karl F. Ross

[57] ABSTRACT

A gear drive with single-helix gears in which a pair of such gears mesh with each other and are formed along the length thereof with one or more grooves of a depth equal to or not substantially greater than the tooth height and provided with lubricant-stripping means, e.g. deflectors, to remove the lubricant which passes into these grooves. The grooves of the two gears are aligned in planes perpendicular to the axes of the gears.

10 Claims, 6 Drawing Figures

GEAR DRIVE WITH SINGLE-HELIX GEARS

FIELD OF THE INVENTION

The present invention relates to single-helix helical gear drives and, more particularly, to improvements in the lubrication and cooling of such drives.

BACKGROUND OF THE INVENTION

In high-speed transmissions and gear assemblies using helical gears, i.e. with peripheral speeds at the contact circle of the teeth in excess of about 100 meters/second, and for high power (e.g. 5 to 100 MW) it is common to provide single-helix, wide gears, i.e. gears having an axial length and a diameter in ratio in excess of 0.8. Because of the friction developed in the meshing teeth of such gears, large amounts of heat are generated. Experiments have shown that such heat is not a significant function of the load, but rather is practically exclusively a function of the peripheral speed of the two gears.

Removal of the heat which is thus generated is vital for effective operation of the transmission, e.g. to limit wear and distortion of the teeth and a toothed periphery of the heat.

The lubrication of the transmission thus has the double function of reducing friction in accordance with conventional lubrication concepts, i.e. by interposing a thin film of a low-friction fluid between the contacting surfaces of the meshing teeth, and also the function of dissipating the heat generated by the meshing teeth. To this end it is the conventional practice to provide a so-called tooth spray whereby the liquid lubricant, i.e. oil, is introduced into the meshing region and is displaced by compression in the gaps between the teeth with an axial component.

As a result the temperature along the length of the wide gear has a distribution as represented in FIG. 1 for a conventional single-helix helical gear of the axial length or width B. In FIG. 1 of the drawing, the temperature has been plotted along the ordinate T and the axial length along the abscissa B, the left- and right-hand ends of the curve representing the opposite axial ends of the gear. As will be apparent from this figure, over approximately the left-hand half of the gear, assuming that the displacement of lubricant is to the right as represented by the arrow A, the temperature increases gradually from a temperature $T_1$ to a temperature $T_2$. Between the midpoint of the gear and the right-hand axial end thereof, the temperature rises shortly to a peak $T_3$ and then falls off to a temperature $T_4$ not significantly higher than the temperature $T_2$. Naturally, because of the high temperature in the right-hand half of the gear, the teeth are subject to severe distortion. In this respect reference may be made to *Mechanism and Machine Theory*, 1973, Vol. 8, Pages 293-303, L. Martinaglia, presented at the International Symposium on Gears and Transmissions, San Fransisco, California, Oct. 11-13, 1972.

Since the temperature distribution in operation is asymmetrical, the distortions resulting from temperature differentials tend to be asymmetrical as well and can cause considerable local wear which may render the system inoperative.

To the present, as far as applicants are aware, there has been no way to prevent the aforedescribed temperature distribution for an ordinary single-helix helical gear and hence no practical way in which the thermal deformations can be prevented.

It has been proposed to compensate for the aforedescribed temperature distribution and the deformations associated therewith by modifying the shapes of the teeth along their lengths so that, even with deformation, there is no increase in wear or such tendency to increased wear is reduced. The systems for correcting the teeth along their lengths, however, are disadvantageous in that they require separate machining processes and prohibitibely raise the cost of the gear and a transmission incorporating same.

Of course, such corrections are only effective for a single operating state of the gear or transmission, since only a specific temperature distribution and temperature increase can be compensated thereby. For other operating states, the correction is ineffective and hence the transmission can only be operated with a constant load at a fixed speed.

OBJECTS OF THE INVENTION

It is the principal object of the present invention to provide a gear arrangement in which the aforementioned disadvantages are avoided.

Still another object of the invention is to provide a helical gear transmission in which the tendency for asymmetrical temperature distribution is reduced or eliminated and hence the threat of thermal deformation is obviated.

Still another object of the invention is to provide a helical gear transmission of relatively low cost and long life which can be operated at high speeds without the problems which have arisen with earlier high-speed transmissions using helical gearing.

SUMMARY OF THE INVENTION

These objects and others which will become apparent hereinafter are attained, in accordance with the present invention, which is based upon our discovery that it is possible to control the lubricant or oil flow aong the axial length of the meshing gears in a relatively simple but unique manner so as to minimize temperature variation therealong if each of the meshing gears is provided with a circumferential groove of a depth equal at least to the height of the teeth and lying in a common plane perpendicular to the parallel axes of rotation of the gears, an oil deflector being provided in these grooves in the meshing region of the gears.

More specifically, at substantially the same location (axially) along the gears, each of the meshing single-helix helical gears of the transmission is provided with a groove radially aligned and registering with the groove of the meshing gear and the oil is pressed laterally through the channels formed between the helically disposed teeth, the oil being diverted out of the system at these grooves. In general, the grooves have a depth at least equal to the height of the teeth and preferably are not substantially deeper than this height so that where the tooth height is $h$, the depth $t$ of the groove should be between $1h$ and $1.2h$.

According to a feature of the ivention, the oil deflector, which can be a blade lying in a plane perpendicular to the axes of the two gears and can be elongated to extend perpendicularly to the common axial plane of the gears, preferably horizontally, is disposed to one side of the median plane through the registering grooves perpendicular to the aforementioned axial plane.

When the transmission is driven in only one sense, therefore, the blade reaches into the grooves in the meshing region but is displaced from the aforementioned median plane to lie a slight distance ahead of the meshing region to be screened off by the deflector. In other words, the oil displaced laterally from one section of the gear is prevented from entering the next section by the deflector blade disposed immediately ahead of the meshing region thereof and at a slight distance therefrom.

According to a feature of the invention, the transmission includes a small diameter gear or pinion and a large diameter or driven gear, the depth of the groove of the driven gear being substantially greater than the depth of the groove of the pinion and, if desired, substantially greater than the tooth height of the driven gear. It is possible, in accordance with the feature of the invention, to provide a groove depth of the driven gear which is much greater than the tooth height (up to $3h$). The gear meshing with the pinion can also be subdivided into a plurality of separate gear wheels on a common shaft or on separate shafts with a spacing corresponding to the axial width of the groove of the pinion. Preferably, however, the gear connected with the pinion is formed unitarily with toothed sections and intervening grooves as described, i.e. in one piece. Of course the pinion is always formed in one piece according to the invention.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 2:
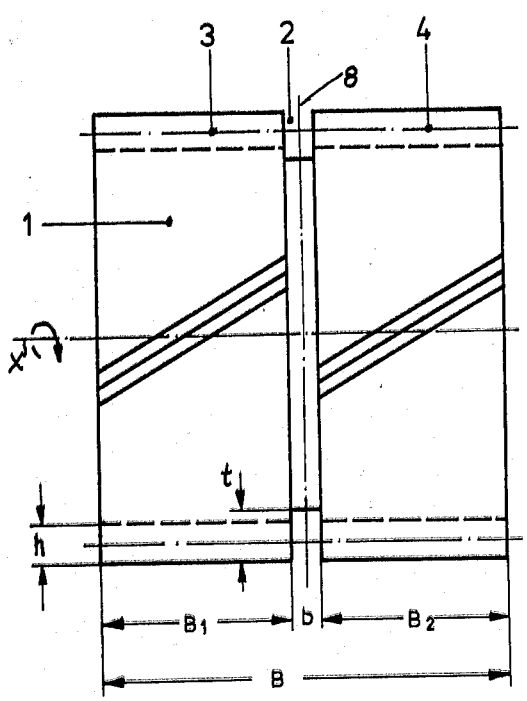
FIG. 2 is an elevational view of a gear according to the invention.

FIG. 2 shows one of the gears of a transmission of the type later described and consisting of a pair of single helix helically toothed sections 3 and 4 of axial lengths $B_1$ and $B_2$, respectively, the gear 1 having the overal axial length B. The groove 2 has an axial width $b$, a median plane 8 perpendicular to the axial X and a tooth height $h$. The groove has a depth $t$ which, in the embodiment illustrated, is only slightly greater than the height of the teeth $h$.

With this system, the oil expressed from the left half 3 of the gear cannot pass directly into the right half 4 thereof to raise the temperature therein and lubrication of the right half as well as the left half is effected by spraying in the conventional manner by means not shown. The temperature distribution when this gear is used in a transmission can be found in FIG. 3.

Figure 1:
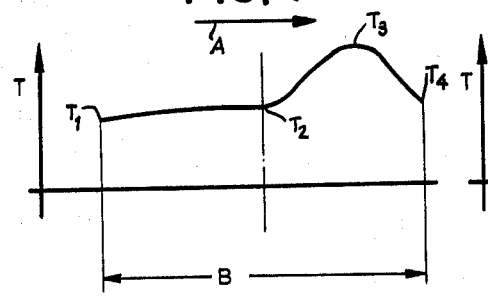
FIG. 1 is a graph illustrating the temperature distribution across the length of a pair of meshing gears of prior-art construction.
Figure 3:
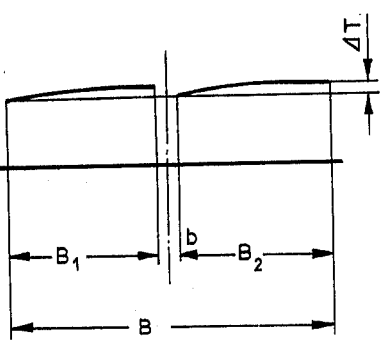
FIG. 3 is a temperature diagram illustrating the temperature rise with the use of the last-mentioned gear.

FIG. 3 is the temperature diagram analogous to FIG. 1 and which has the temperature T plotted along the ordinate against the axial length of the gear plotted along the abscissa. In each of the sections the maximum temperature rise $\Delta T$ is seen to be minimal and there is a break in the temperature-rise curve in the region corresponding to the gap $b$.

Figures 4A, 4B:
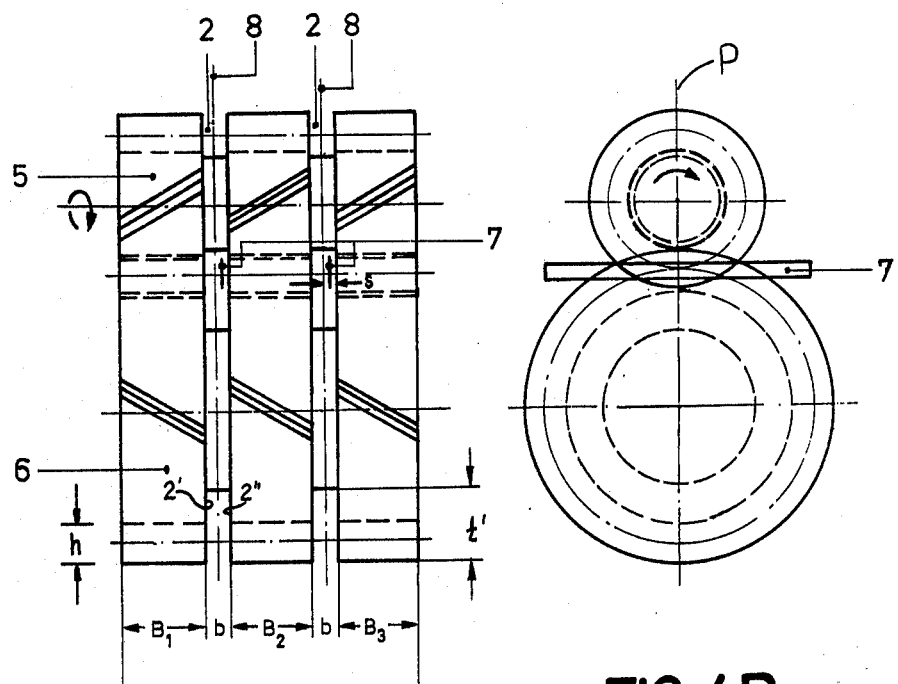
FIG. 4A is an elevational view of a transmission embodying the invention.
FIG. 4B is an end view thereof.

In FIGS. 4A and 4B, we have shown a transmission in which the pinion 5 meshes with the gear 6, both the pinion and the gear 6 being subdivided over their length B into three toothed sections $B_1$, $B_2$ and $B_3$ by respective grooves 2 having axial widths $b$. In each of the grooves 2 which are aligned along a plane perpendicular to the common axial plane of the gears (corresponding to the plane of the paper in FIG. 4A) there is provided an oil-deflecting blade 7 which extends horizontally and hence perpendicular to the common axial plane P as seen in FIG. 4B. The blade 7 lies in a plane parallel to the median plane 8 of each groove and is disposed a slight distance $s$ ahead of the intake side of the meshing teeth of sections $B_3$ and $B_2$, respectively, to shield them against the flow of the oil expressed from the meshing teeth of sections $B_1$ and $B_2$ respectively. The deflector 7 disposed in the left-hand pair of grooves 2 conducts the oil disposed to the right from sections $B_1$ out of the groove and prevents it from entering the meshing tooth region of the sections $B_2$. The deflector 7 of the other set of grooves operates similarly.

In the embodiment of FIGS. 4A and 4B it will be apparent that the driven wheel 6 has a groove depth $t$ which is significantly greater than the tooth height $h$. With this increasing depth of the groove, the faces 2' and 2'', i.e. the flanks of the groove, can participate in deflecting an oil away and cooling the wheel.

Figure 5:
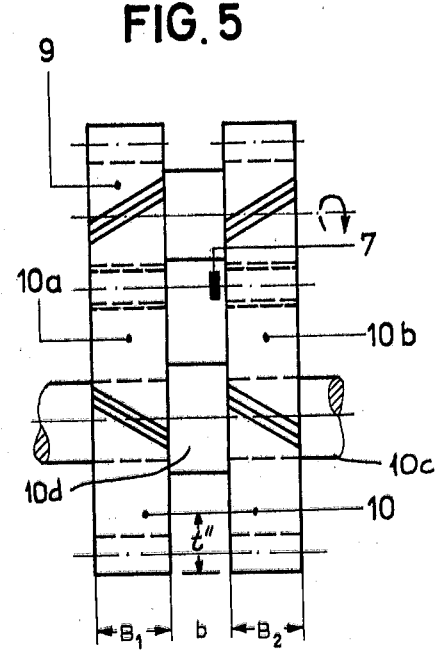
FIG. 5 is a view similar to FIG. 4A but illustrating another embodiment of the invention.

FIG. 5 shows another single helix gear pair 9 and 10 forming a transmission. The unitary pinion 9 meshes with the gear 10 formed by a pair of gear wheels 10a and 10b keyed to a common shaft 10c with a spacer 10d between them. For a gear of the total axial length B, the gear wheel 10a and 10b have axial width $B_1$, $B_2$, where $B_1 = B_2$. The spacer has an axial width $b$ corresponding to the width of the groove which here has an axial width $b$ corresponding to the width of the groove which here has a depth $t$. In all of the embodiments disclosed, $B = nB_1 + (n - 1)b$, where $n$ is the number of toothed sections, $(n - 1)$ is the number of grooves, $b$ is the width of each such groove (all being equal) and $B_1$ is the axial width of each toothed section (all being equal).

For the sake of completeness, it is pointed out that published German Application (Auslegeschrift) 1,215,463 discloses a system in which the driven gear of a transmission is formed with a groove in which a ring shrunk onto a pinion engages to function as an oil dam. This system has been found to be relatively expensive and only partially effective because of the heat conduction. We believe that the improvement of the present system over that of this prior structure is a result of the fact that our system does not dam the movement of the oil but actually removes it between the two toothed sections.

We claim:

1. A transmission comprising a pinion gear meshing with a further gear, each of said gears being formed with single-helix gear teeth and said gears meshing with each other in a meshing region, each of said gears being provided with at least one circumferential groove open in the direction of and registering with the groove of the other gear, said grooves having depths at least equal to the height of the teeth of the respective gear, and an oil deflector disposed in said grooves in said region.

2. The transmission defined in claim 1 wherein said grooves have a common median plane perpendicular to the axes of said gears, said deflector being offset to one side of said plane to shield meshing teeth of one section of the gears from oil displaced by the other.

3. The transmission defined in claim 2 wherein said deflector is offset from said median plane toward said one section.

4. The transmission defined in claim 3 wherein the depth $t$ of the groove of said other gear is substantially greater that the height $h$ of the teeth thereof.

5. The transmission defined in claim 3 wherein $t$ is between $1h$ and $3h$.

6. The transmission defined in claim 3 wherein the depth $t$ of said groove of said pinion gear is at most slightly greater than the height $h$ of the teeth thereof and $t$ is between $1h$ and $1.2h$.

7. The transmission defined in claim 3 wherein said other gear includes a pair of gearwheels and means spacing said gearwheels apart to define said groove of said other gear between said gearwheels.

8. The transmission defined in claim 3 wherein each of said gears has only one groove dividing the respective gear into two sections of equal axial width.

9. The transmission defined in claim 3 wherein said gears each are formed with two axially spaced grooves dividing the respective gear into three axially spaced toothed sections of equal width.

10. A transmission comprising a pinion gear meshing with the further gear, each of said gears being formed with single-helix gear teeth, said gears meshing with other ones in a meshing region, each of said gears being provided with at least one circumferential groove open in the direction of and registering with the groove of the other gear, each of said grooves having a depth less than the radius of the respective gear but at least equal to the height of the teeth thereof, the teeth on each side of the groove of the respective gears extending the helix of the teeth on the opposite side of the respective groove.

* * * * *